L. C. MALTBY.
MECHANISM FOR CUTTING TUBES.
APPLICATION FILED FEB. 21, 1916.
1,201,843.
Patented Oct. 17, 1916.
2 SHEETS—SHEET 2.
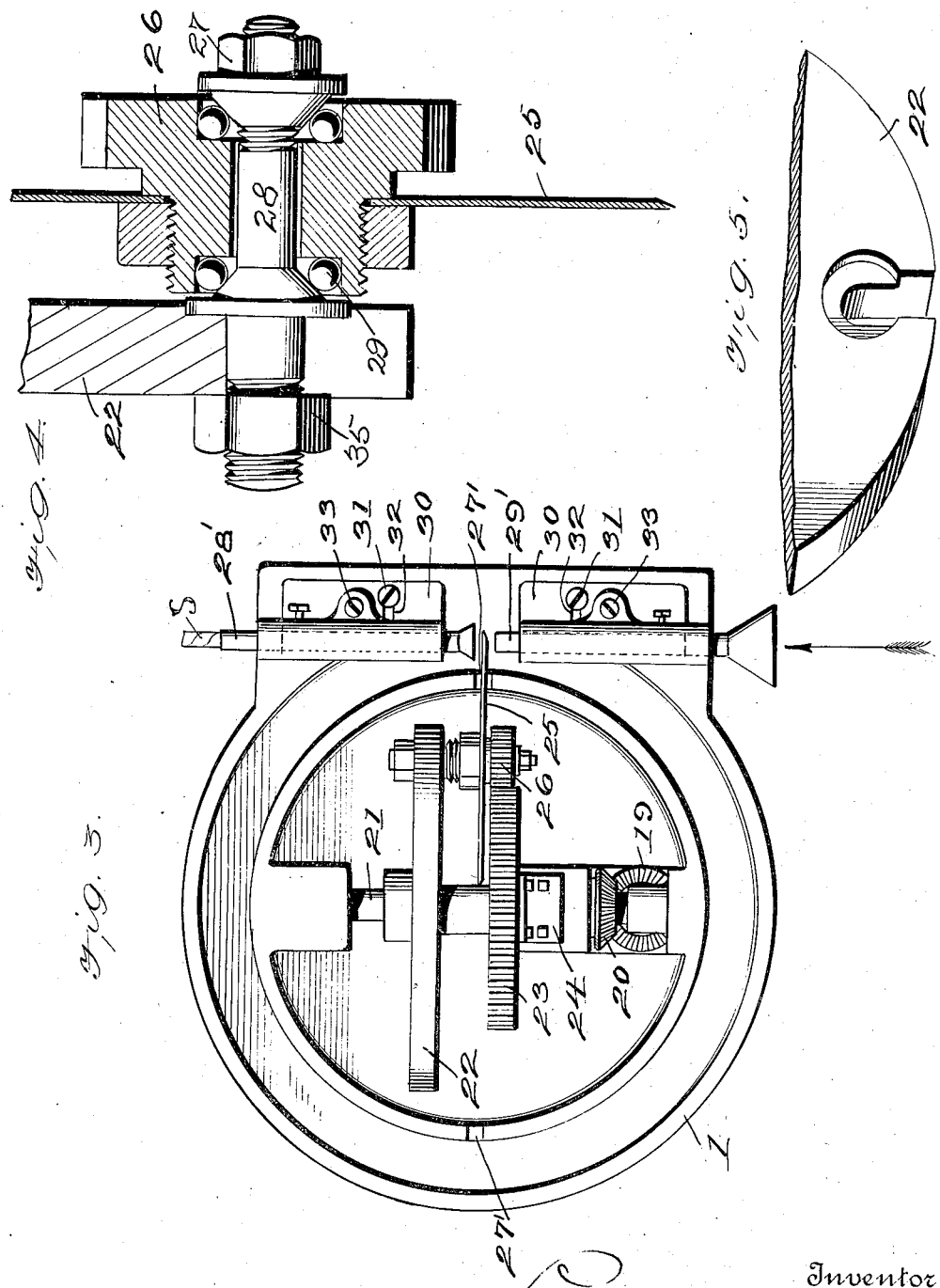

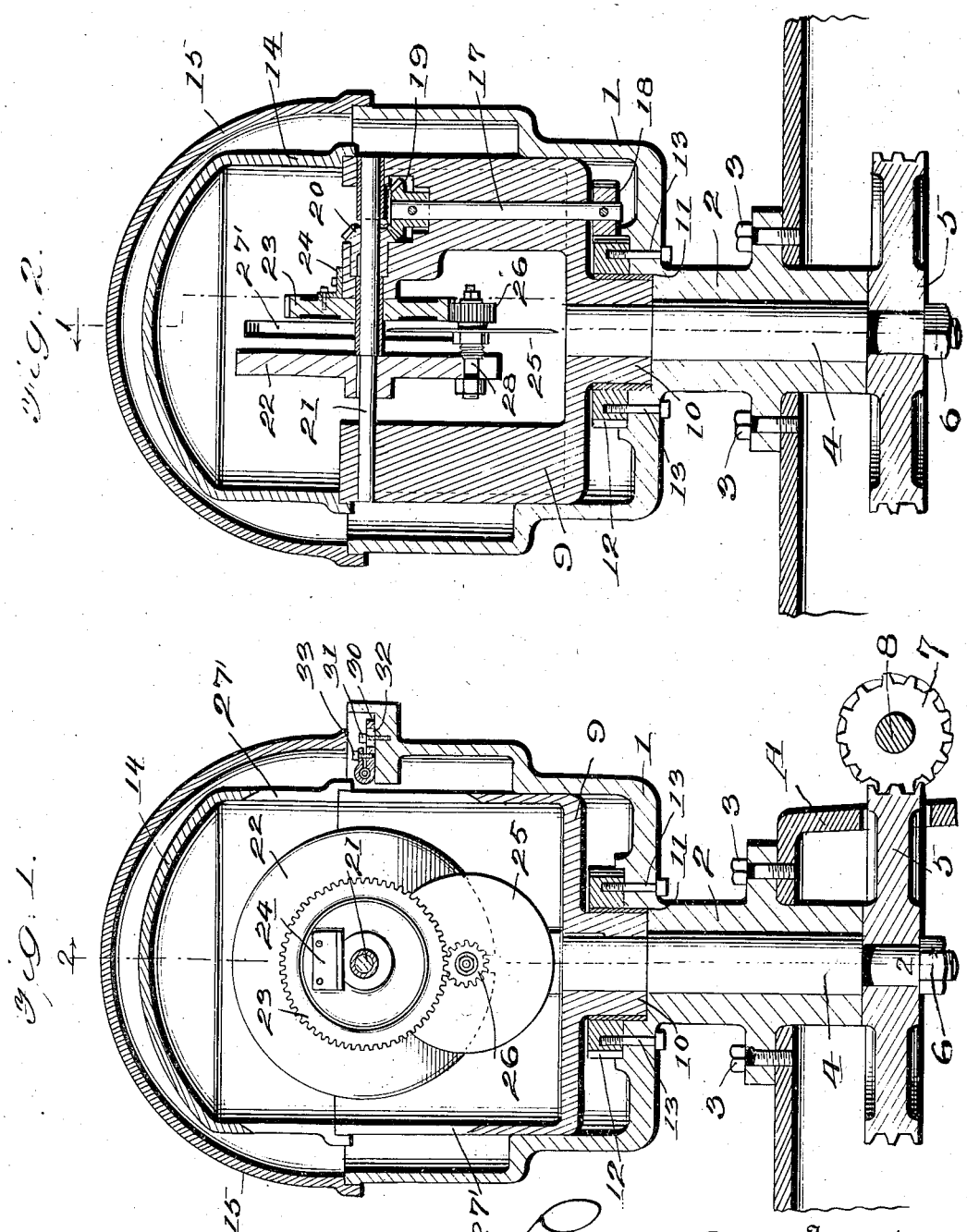

UNITED STATES PATENT OFFICE.

LEWIS C. MALTBY, OF WASHINGTON, DISTRICT OF COLUMBIA, ASSIGNOR TO THE STONE STRAW COMPANY, OF WASHINGTON, DISTRICT OF COLUMBIA, A CORPORATION OF NEW JERSEY.

MECHANISM FOR CUTTING TUBES.

1,201,843.  Specification of Letters Patent.  Patented Oct. 17, 1916.

Application filed February 21, 1916. Serial No. 79,756.

*To all whom it may concern:*

Be it known that I, LEWIS C. MALTBY, a citizen of the United States, residing at Washington, in the District of Columbia, have invented certain new and useful Improvements in Mechanism for Cutting Tubes, of which the following is a specification.

My invention relates to an improvement in mechanism for cutting tubes into lengths.

The present invention comprises another possible form that the invention disclosed in my accompanying application, Serial No. 79,755, might take, and consists in a rotatable shaft which carries a housing which affords support for two other intergeared shafts driven by the rotation of the first-named shaft, and one of which carries a head which affords support for a rotary disk or cutter. This disk or cutter travels in a certain orbit and at predetermined intervals crosses the path of the tube or straw to be cut, whereby to sever the latter and move on at a speed no less than that of the on-coming straw in order to get out of its way, and not obstruct its forward movement in the slightest degree.

This invention further consists in means for adjusting the straw-guides with respect to the disk or cutter, and with respect to each other.

In the accompanying drawings: Figure 1 is a vertical section on the line 1—1 of Fig. 2; Fig. 2 is a vertical section at right-angles thereto on the line 2—2 of Fig. 1; Fig. 3 is a plan view with parts removed; Fig. 4 is an enlarged sectional detail of the disk or cutter-support; and Fig. 5 is a fragmentary detail showing the lower edge of the circular head which supports the disk or cutter.

A, represents the machine-bed or frame. The casing 1 is provided with a hub 2, which is held fast to the bed A by bolts or other means 3, 3, and it forms a bearing for the vertically-disposed rotatable shaft 4, to the lower end of which the large spiral gear 5 is secured by a nut 6. This receives motion through spiral drive-gear 7 secured on the main drive-shaft 8, as shown in Fig. 1. The lower end of the casing forms a bearing, in which the cylindrical housing 9 rotates, and the hub 10 of this casing is fitted into a socket 11, provided therefor, at the upper end of the casing hub 2, as shown in Figs. 1 and 2. Surrounding the hub 2 of the casing is a gear 12, which is held fast to the housing by bolts 13. A cap 14 is fitted to the top of the housing 9 to inclose and guard the moving parts therein, and a similar cap 15 is adapted to be fitted to the top of the stationary housing 1, as shown in Fig. 1.

A vertically-disposed shaft 17 is rotatably supported in one of the pillars of the housing 9, as shown at the right in Fig. 2, and this vertical shaft 17 has a pinion 18 keyed to its lower end, which is meshed with the stationary gear 12, surrounding the hub of the housing 9, as shown in Figs. 1 and 2, and it has a miter 19 keyed to its upper end, which miter engages a miter 20 on the horizontal shaft 21 journaled in the upper ends of the pillars of the housing, as shown in Fig. 2, transmitting motion thereto. A circular head 22 is keyed to this horizontal shaft 21, and a stationary gear-wheel 23 is secured by a plate 24 bolted thereto and to one of the bearings in the upper end of housing 9, as shown in the upper end of Fig. 2. Connected with and carried by the circular head 22, is the disk cutter 25, which is secured on the hub of a gear 26 by the nut 27 and the gear and cutter are mounted on the axle 28, with interposed ball-bearings 29, and axle 28 is bolted and secured to the circular head 22, as shown in detail in Fig. 4 by a nut 35. The teeth of the gear 26 are meshed with the stationary gear 23, as shown in Figs. 1, 2, and 3. So as the shaft 4 is rotated, the housing 9 secured thereto also rotates, carrying with it the vertical shaft 17 and the horizontal shaft 21, the former being revolved by the stationary gear 12 engaging the pinion 18 on the lower end of shaft 17, and through miters 19 and 20 transmitting motion to the horizontal shaft 21, and through the latter to the circular head 22, thus carrying the disk cutter 25 in a circular orbit around stationary gear 23, thereby imparting a high speed to the disk cutter, and causing it to cross and re-cross the path of the tube or straw S, which is to be severed, and in so doing to turn on its vertical axis 4, thereby cutting the straw, and getting out of its way by traveling with and at the speed of the straw without retarding it or causing it to buckle. Vertical slots 27' are provided to afford clearance for the disk or cutter when it reaches the point of severing the straw or tube.

In my present invention, there are two straw-guides 28' and 29'. These are arranged in alinement with each other, as shown in Fig. 3, and are adjustably held by means of clamps 30, which latter are adjustable to and from the straw through the medium of set-screws 31, 31, operating in the slots 32, as shown in Figs. 1 and 3. The clamps are tightened around the guides 28 and 29 by the set-screws 33, 33, as shown in Figs. 1 and 2. In this way, not only may the straw-guides be adjusted with respect to the straw to move it near thereto, or farther away, but also they may be adjusted to get them into exact alinement by swinging and holding the clamps 30, and the guides 28' and 29' may be adjusted endwise with respect to the straw to bring them in closer or more remote proximity thereto; thus providing means for supporting the straw on either side of the disk or cutter, and as close as practicable thereto, as clearly shown in Fig. 3.

I claim:

1. The combination of a housing, two intergeared shafts carried by and journaled in the housing, a head secured to one of said shafts, a disk cutter rotatably supported by the head, and means for transmitting rotary motion to the disk cutter as the head carrying the disk cutter revolves.

2. The combination of a stationary casing and a housing fitted to rotate therein, two shafts carried by and journaled in the housing, one of which transmits motion to the other, a head secured to one of said shafts, a disk cutter rotatably supported by the head, and means for transmitting rotary motion to the disk cutter as the head carrying the disk cutter revolves.

3. The combination of a stationary casing and a housing fitted to rotate therein, two shafts carried by and journaled in the housing at an angle to each other, with means for transmitting motion from one to the other, one being rotated as a result of the rotation of the housing within the casing, a head secured to one of said shafts, a disk cutter rotatably supported by the head, and means for transmitting rotary motion to the disk cutter as the head carrying the disk cutter revolves.

4. The combination with a stationary casing, a shaft having a housing secured thereto, the shaft and housing fitted to rotate within parts of the casing, a gear surrounding the shaft and secured to the casing, of two shafts journaled in the housing at an angle to each other, each having a transmission gear whereby the motion of one is imparted to the other, and one having a gear engaging the teeth of the stationary gear, whereby it is rotated by reason of the rotation of the housing within the casing, a head secured to one of the shafts, a disk cutter rotatably supported on the head and having a pinion connected therewith, and a stationary gear, the teeth of which said pinion engages, whereby with the rotation of the several shafts a rotary and orbital motion is imparted to the disk cutter.

In testimony whereof I affix my signature.

LEWIS C. MALTBY.